July 17, 1934.   H. E. BUCKLEN   1,966,882
AUTOMOBILE HEATING SYSTEM
Filed Nov. 26, 1930   4 Sheets-Sheet 1
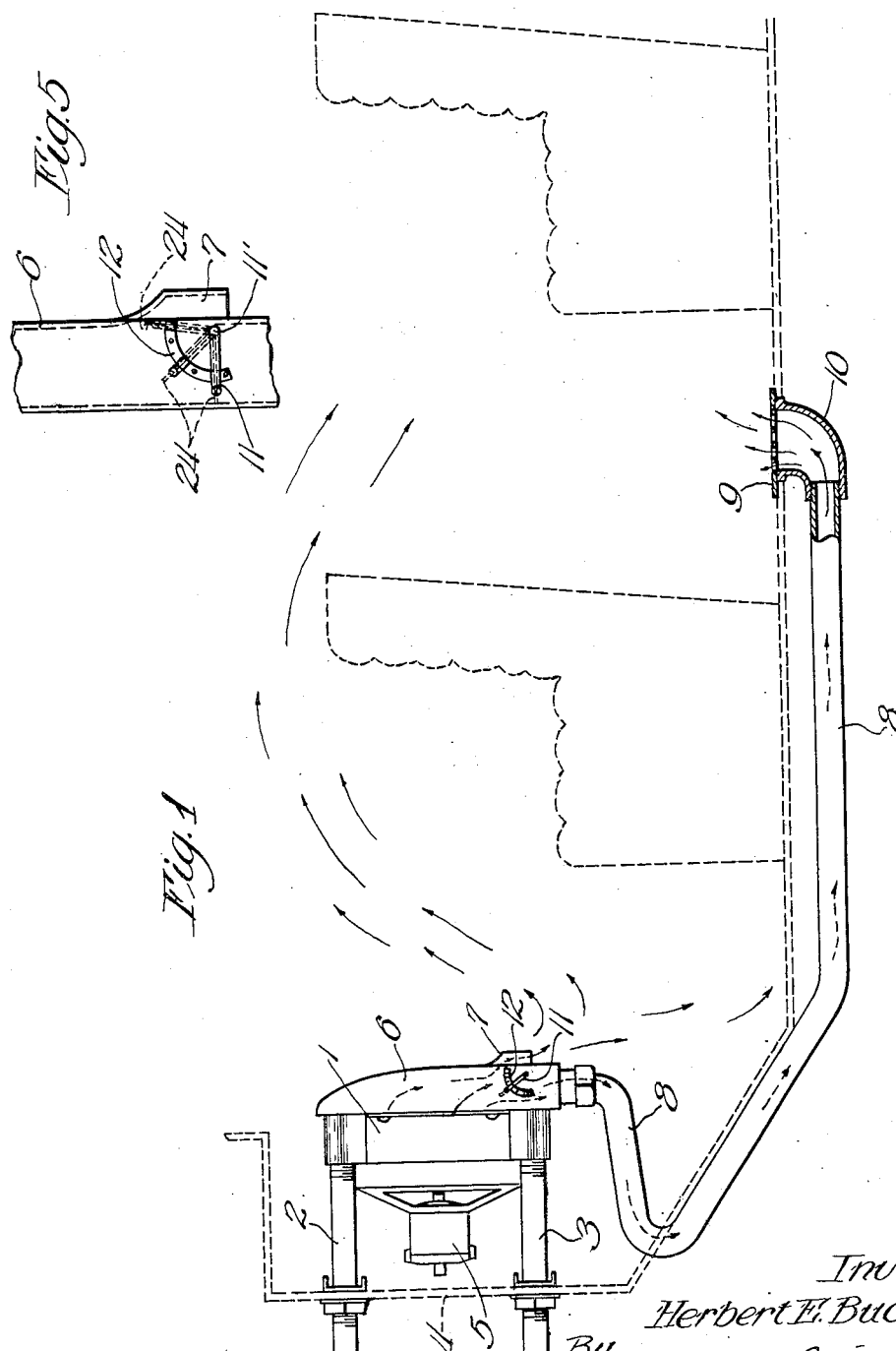

July 17, 1934.   H. E. BUCKLEN   1,966,882
AUTOMOBILE HEATING SYSTEM
Filed Nov. 26, 1930   4 Sheets-Sheet 2
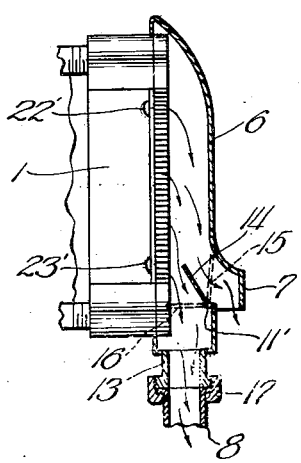
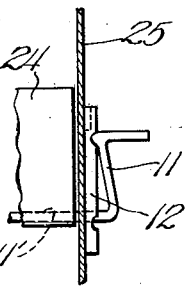
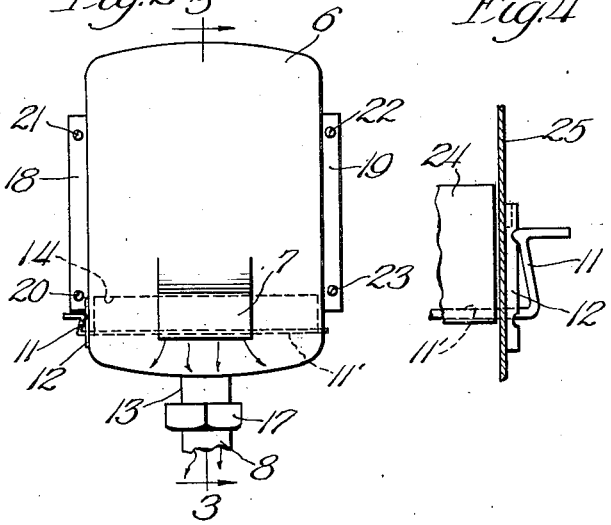
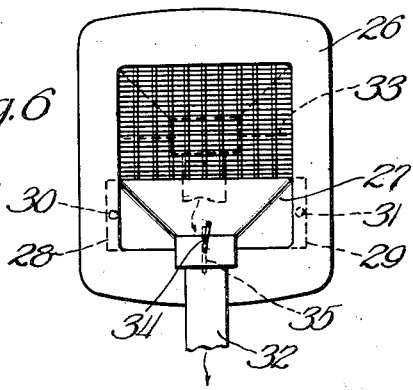
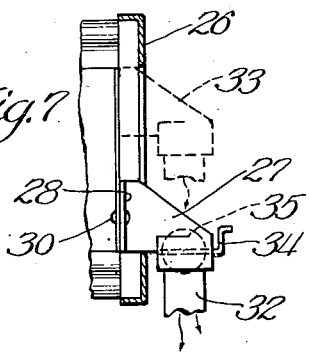
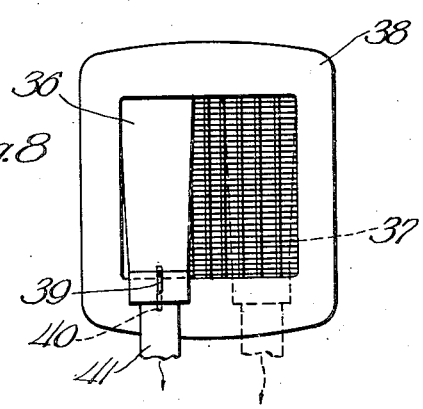
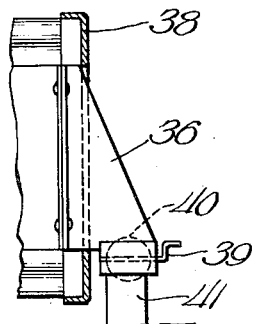
Inventor:
Herbert E. Bucklen
By Brown Jackson Boettcher Dienner
Attys.

July 17, 1934. H. E. BUCKLEN 1,966,882
AUTOMOBILE HEATING SYSTEM
Filed Nov. 26, 1930 4 Sheets-Sheet 3
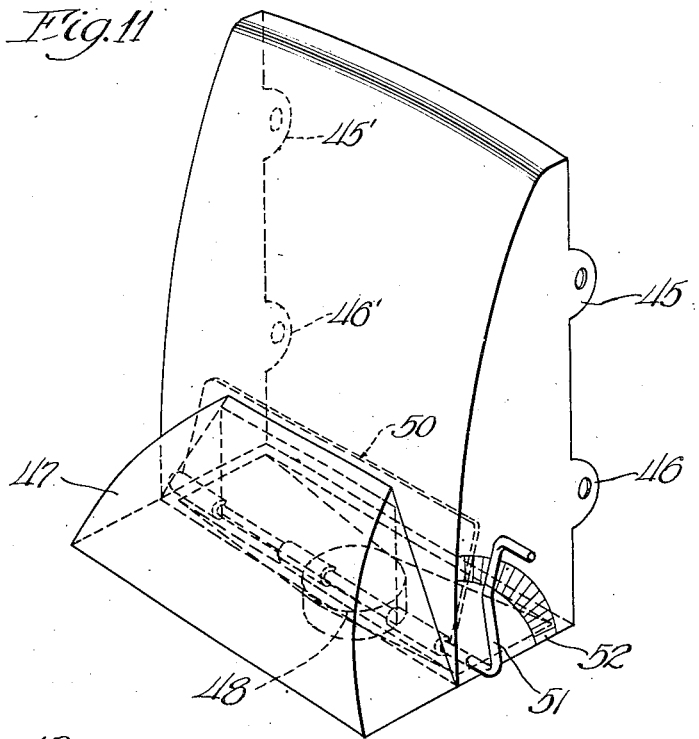
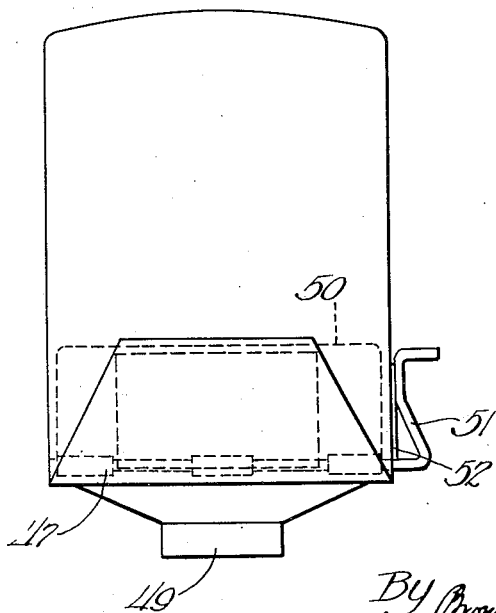
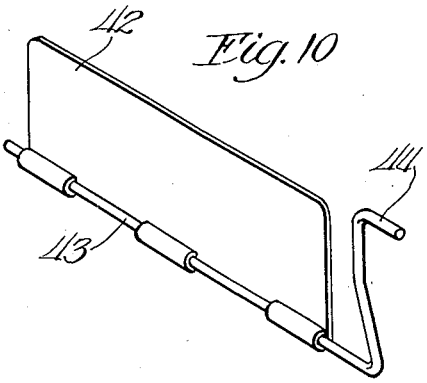
Inventor:
Herbert E. Bucklen
By Brown, Jackson, Boettcher & Dienner
Attys.

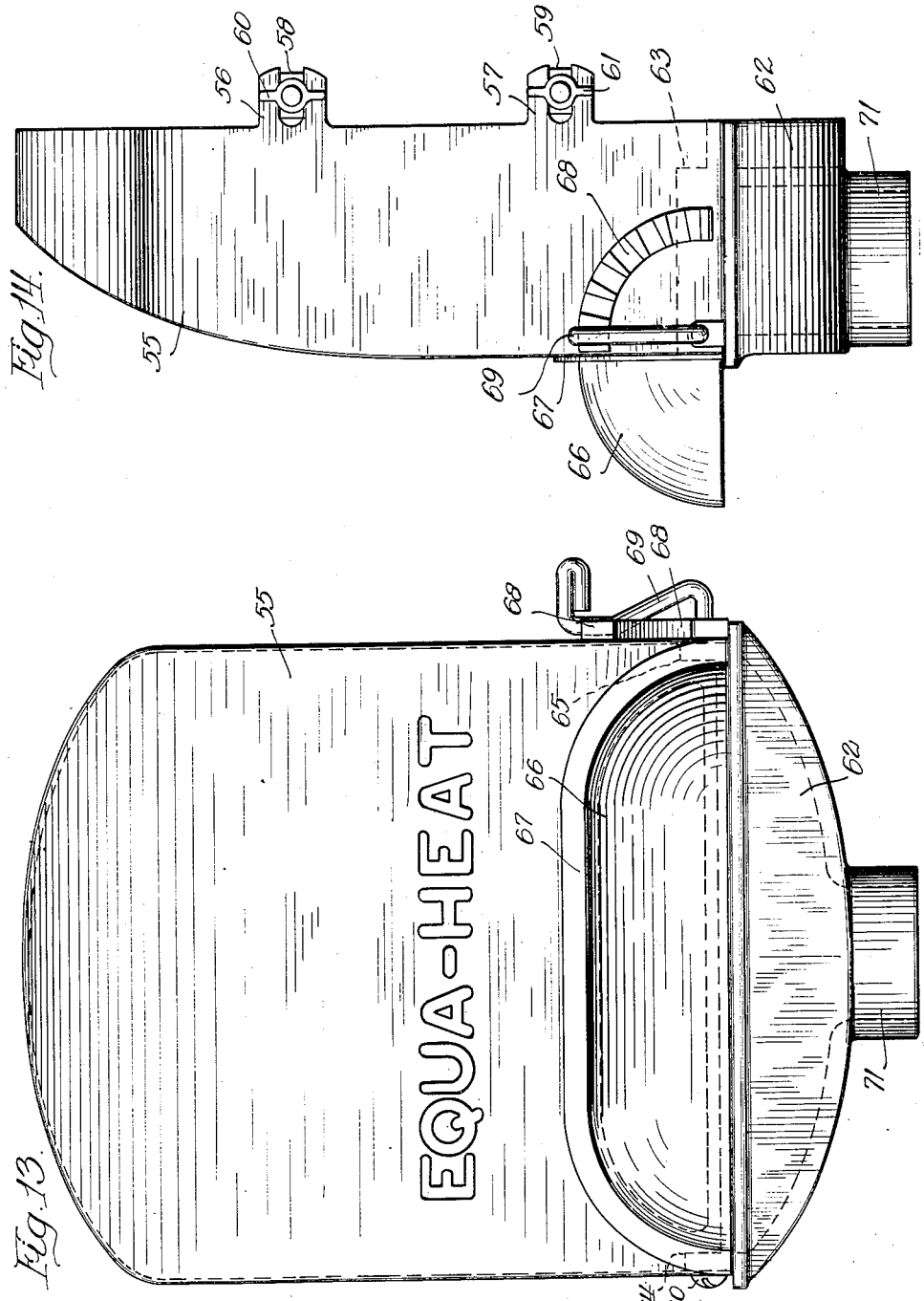

Patented July 17, 1934

1,966,882

UNITED STATES PATENT OFFICE 1,966,882

AUTOMOBILE HEATING SYSTEM

Herbert E. Bucklen, Elkhart, Ind.

Application November 26, 1930, Serial No. 498,323

3 Claims. (Cl. 237—12.3)

This invention relates generally to heating systems for vehicles, and is more particularly concerned with a novel and improved system and apparatus for heating automobiles.

There are several systems known for heating the interior of automobiles.

Some of the systems utilize the heat of the exhaust or of other parts of the engine for heating auxiliary apparatus through which fresh air is circulated. The air is heated in this manner and is discharged into the interior of the automobile. Systems of this type are generally inefficient and occasion several objections. They produce dry heat which is unpleasant and may under certain conditions be annoying. There is no heat distribution of the hot air within the interior of the vehicle and the heating is extremely uneven since it is dependent on the temperature of the exhaust or other parts subject to heating by the operation of the engine. It may happen under certain conditions that very hot blasts of air are discharged while at other times the heating is insufficient due to slow operation of the engine. Such heaters, utilizing the heat from the exhaust pipe or from the manifold produce burnt air heat in which the oxygen is burned out. Burnt oil odors and burnt metal odors are discharged into the interior of the automobile together with road dirt and other foreign matter due to the fact that the heater is located at a point where the air is contaminated. When travelling in road traffic, the lower strata of air contains carbon monoxide gas from the exhausts of other vehicles. This contaminated air is drawn through the heater and discharged into the automobile. It, therefore, happens often that the occupants open the windows and endure exposure rather than the unhealthy conditions caused by this old form of heating.

Other systems which constitute an advance over the above intimated systems employ a small hot water heater which is installed within the automobile, usually under the dashboard, in the front compartment of the vehicle. The heater is connected to the radiator, and the water from the radiator circulates through the heater. A small fan placed behind the hot water heater blows the heated air into the interior of the automobile.

Systems of this latter type, although attacking the problem of heating the interior of an automobile in a more advantageous manner, offer numerous objections. The chief objection resides in the fact that the hot air is blown into the front compartment in one stream without taking care of the distribution of the heat throughout the entire automobile. The heat produced acts locally usually within the front compartment. There is no provision for even distribution of the heat in the front compartment while the rear compartment is utterly neglected. Under the most favorable conditions the hot air will be blown in a stream midway between the floor and the roof of the car. Ordinarily, however, the hot air will rise from the heater and heat the upper portion of the car, while a heat circulation is needed from the bottom to the roof.

Obviously, an efficient heating system should function to distribute the heated air to the bottom of all compartments of the vehicle from where it can rise and circulate to create an even and pleasant temperature in the entire automobile.

The need for such heating system is felt by every automobile owner during cold weather, and has also been sensed by manufacturers of expensive automobiles. A solution of the problem of heating was attempted in some cases by installing separate heaters in the individual compartments of a car. The problem may be partly solved in this manner, but it is obviously an expensive way of attack and the benefits are therefore not generally available. Difficulties arise in cases of this character using a hot water heater with feeder pipes for the heating of the rear compartments of a car. The water is not properly circulated during severe cold weather. The unit closest to the engine will absorb the greater part of the heat to the detriment of the units further removed. Therefore, these latter types of heating systems solve the problem only partially as was previously intimated.

None of the systems heretofore practiced provide adequate heating for open cars, and none of these systems combine the heating with a proper ventilation.

The system and apparatus which I have invented solves the problem of car heating satisfactorily, and overcomes the defects of prior systems while retaining all the advantages thereof.

The chief aim and object of my invention is to provide a heating system for automobiles, which solves the problem of heating the interior of an automobile and of distributing the heat evenly to all compartments in an inexpensive and simple manner.

Another object of the invention is concerned with a heating system of this character which may be installed inexpensively in any car in combination with a known hot water heater or other heating appliance.

A further object has to do with a heating system which may be installed in either a closed car or in an open car and provide, in either case, adequate heating of the interior and proper heat distribution through the entire automobile.

Another object is concerned with a heating system of this character which may advantageously serve for the purpose of ventilation during mild weather and during hot weather.

Still another object relates to means for regulating and delivering the heat supply to the various compartments heated from a common source by means of my system.

In order to realize the above and other objects, I provide an attachment for an existing automobile heater which may be installed simply and inexpensively in any automobile having such heater, or which may be furnished initially in conjunction with a suitable heater. The attachment comprises, generally speaking, a cover which is connected to the radiating surface of a hot water heater (or other appliance) for catching and collecting the hot air emitted or produced by the heater. The cover is provided with an opening for emitting or discharging part of the hot air in a downwardly directed stream into the front compartment, and is also provided with means for attaching a hose or suitable other connection for conducting part of the heated air directly to the rear compartment of the vehicle where the air is discharged through a suitable register provided at the bottom of the compartment. A valve is disposed within the cover, at the place where the hot air stream is discharged partly into the front compartment and partly into the connection leading to the rear compartment, or disposed at another suitable place, for regulating and for adjusting the amount of heated air which it is desired to discharge in either direction. In other words, the valve (which may be manually operated) is provided for controlling the heat discharge and the heat distribution throughout the vehicle as desired.

The advantages obtained by my invention will be apparent when the conditions are recalled which I have intimated previously. In the first place, the heated air is evenly and uniformly distributed throughout the interior of the vehicle. It is directed where heat is needed, i. e., the circulation is controlled so that the heated air is deflected downwardly in the front compartment, avoiding a direct stream at the bodies or into the faces of the occupants, and part of the heated air is directly discharged at the bottom of the rear compartment at the place where it is required. Finally, the discharge of heated air into the front as well as into the rear compartment can be regulated as desired. The fact that my invention provides a system which can be installed in any car in conjunction with an existing heater is an important feature apart from the functional benefits which result from the broad idea of correct heat distribution and proper heat regulation. The individual parts are designed with a view of rendering a high class product of great utility and low price.

Further advantages result from the fact that the system of my invention does not draw into the interior of the automobile contaminated road gases. Sweet warm air is forced to every part of the car in uniform distribution.

Instant control is afforded at the source of the heat supply. In the front compartment is usually an excess of heat due to the proximity of the heated engine. An adequate amount of heated air can be directed to the rear compartment below the floor level so that such heat can be brought up under the lap robe and forced to remain close to the feet of the rear seat occupants. A floor latch or trap, register or valve can be provided for local regulation in the rear compartment.

Fresh air, free from exhaust gases, can be taken in by opening the proper windows. The warm air rises and is expelled through the open windows. A healthy condition is thus created which could not be obtained by the use of systems practiced in the past.

A further advantage resides in the fact that, with my system, open cars may be heated for the first time. The forced draft brings the heat up under the lap robe. The heat is emitted at the bottom, e. g., at the feet, where it is most needed. This is, of course, also true in case of closed cars.

Ventilation in hot weather can be obtained with my system. The hot water is turned off in this case; the fresh air, taken in from the most advantageous outside point, can be forced through the fan and the regulating valve will distribute the fresh air to the points where it is needed in the interior of the automobile.

I have said in the above discussion that the system is adapted to provide for heat distribution in the front and rear compartments of an automobile. Most automobiles have only two compartments, and I have, therefore, as will be seen later, adapted the system to be installed in an automobile having two compartments. However, the fact that I have shown the system as applied to a two-compartment vehicle is not to be taken in a limiting sense, since the addition of a third compartment or the use of my system in connection with busses and the like is likewise possible. The term—compartment—is intended to cover also the meaning of—section—when it is desired to use my system for distributing the heat or fresh air supply for ventilating purposes from a suitable source in the interior of a large vehicle which has no compartments in the strict sense of the word, such, for example, as an omnibus or a truck, and the like.

I have also mentioned that the system is used in conjunction with a hot water heater of known construction which is disposed within the front compartment of the automobile. The system is likewise adapted to be used in connection with a heating source of different character. The heater may be located wherever it is desired and the attachment may be modified to suit given conditions.

Defined broadly, my invention disclosed in this case is concerned with an attachment to an automobile heater for distributing and for regulating the heat supply through the interior of a vehicle of this character, and in this sense, my invention discloses a novel system for effecting such even and uniform distribution and regulation of the heat supply in an automobile, regardless whether the automobile is of the closed or of the open type. The invention also discloses a heating system which may be used for the purpose of ventilation in hot weather, and represents, therefore, an appliance of perennial value.

Now, in order to teach others how the invention may be applied in practice, I will describe certain embodiments of the invention in detail with reference to the accompanying drawings, in which:

Figure 1 shows a side view into an automobile, with several parts omitted for the sake of clarity, showing the physical location of my system relative to the heater in one embodiment of the invention;

Figure 2 shows one embodiment of a cover attachment for the heater;

Figure 3 is a section of the heater and of the cover attachment taken on line 3—3 of Figure 2;

Figure 4 is a detail showing particularly the adjusting lever of the embodiment shown in Figures 2 and 3;

Figure 5 is a slightly enlarged partial side view of the cover attachment for illustrating particularly the function of the adjusting and regulating lever;

Figure 6 is a front view of another embodiment of a cover for attachment to a heater, the purpose of which is to conduct heat to the rear compartment of the vehicle;

Figure 7 is a side view of the cover attachment shown in Figure 6;

Figure 8 is a front view of another embodiment of an attachment to a heater for the same functional purpose as the heater shown in Figures 6 and 7;

Figure 9 is a side view of the heater and of the attachment shown in Figure 8;

Figure 10 is a detail, i. e., the adjusting lever and the manner in which the valve is attached thereto;

Figure 11 is an isometric view of a modification of a cover attachment which is functionally similar to the one shown in Figures 2 and 3;

Figure 12 is the front view of the cover attachment shown in Figure 11;

Figure 13 shows the front view of an attachment having structural peculiarities which present certain advantages; and Figure 14 is a side view of the attachment shown in Figure 13.

Referring now particularly to Figure 1, I have shown in this figure a hot water heater designated by the numeral 1 which is mounted in the front compartment of an automobile under the dash board. The heater may, of course, be mounted at any desirable place in the automobile, depending on the effect which it is desired to achieve and on the type of heater which is employed. I have shown a hot water heater of known character in order to give an example of one manner of applying the invention in practice. My system is flexible and may be modified if its use is desired in connection with a heater of different type. The automobile may be of the closed or of the open type. I have omitted details of structure of the automobile in Figure 1 for the sake of convenient description.

In the example shown, the hot water heater 1 is connected to the radiator of the automobile by means of the pipe connections 2 and 3 for circulating the radiator water through the heater 1. The mounting may be accomplished by means of ordinary channel-shaped supporting members attached to the part 4 or in any other suitable manner. A small motor designated by numeral 5 is placed behind the hot water heater 1. This motor operates a fan for forcing the heated air into the interior of the automobile.

The heater, as far as I have described the same above with reference to Figure 1, is generally known. It will be understood that, in the absence of any distributing or regulating means, the heated air is discharged into the interior of the car by the operation of the fan attached to the motor 5, in a stream corresponding to the general size of the radiating surface of the heater. The stream of heated air is directed midway through the front compartment of the automobile. A heat distribution in the proper sense of the word does not take place. The heated air will be blown against the body of the occupant of the front compartment and will rise to the roof of the car where it will remain, since warm air is lighter than cold air. A circulation of the heated air is not provided for and therefore will not take place beyond a slight natural circulation which is inefficient. Where the heat is mostly needed, that is, at the bottom of the front compartment and also at the bottom of the rear compartment, it will not be circulated at all. The heater alone does not represent a heating system in the proper sense, and is unsuitable for heating open cars. Likewise, its use is limited to heating; a conversion into a ventilating system during hot weather will not be effective. The heater is, for this reason, usually removed at the end of the cold season.

Such use as a ventilator system is contemplated by my invention. Therefore, in describing the function of my system, the circulation of fresh air during hot weather will be substantially along the same path as the circulation of heated air during cold weather.

Now, examining the Figure 1 again, it will be seen that I have provided a cover 6 which is attached to the hot water heater 1 for catching the heated air expelled by the operation of the fan consequent to the operation of the motor 5. This cover 6 is provided at its lower end with a flaring portion 7 having an opening through which part of the heated air will be discharged downwardly in the direction of the arrows.

Part of the heated air will circulate in the direction of the arrows toward the top and rear of the automobile. A connection designated by the numeral 8 (which may be a flexible hose or the like) is provided in attachment with the lower portion of the cover 6 for conducting part of the heated air directly to the rear compartment. Attached to the bottom of the rear compartment is a register 9 (if desired this register may be adjustable) and cooperating with this register is a tubular angular member 10 to which is attached the connection 8 in a suitable manner. The connection may be made by means of a threaded joint as shown or in any other simple manner.

Heated air from the hot water heater 1 will be deflected and distributed partly into the front compartment and partly into the rear compartment generally in the directions shown by the arrows in Figure 1. I have provided in the cover 6 a valve for regulating the heat distribution and the heat supply to the front and to the rear compartments, respectively. This valve may be manually operated by means of an adjusting lever 11 shown in Figure 1 which cooperates with a segment 12. The lever 11 may be rotated along the segment 12 and set with respect to the segment 12 in grooves or indentations provided in this segment for holding the lever 11 in any desired operating position. This lever 11 may be an ordinary piece of wire bent in a suitable shape. Attached to the wire in the interior of the cover 6 is a valve. When the lever is adjusted with respect to the segment 12 in the position in which it is shown in the drawings Figure 1, heated air will be discharged through the flaring portion 7 of the cover and also through the connection 8 into the rear compartment. If it is desired to shut off the heat supply to the rear compartment, the adjusting lever 11 will be operated into a horizontal position, thereby closing the outlet from the cover 6 to the connection 8. When it is desired to discontinue the heat supply to the front compartment, the lever is operated by 90 degrees from the horizontal position and will close thereby the opening through which the air is discharged into the flaring portion 7 of the cover 6.

Referring now particularly to Figure 2, it will be seen that the cover 6 is provided with a flange 18 on one side and with a flange 19 on the other side, for attachment to the radiating surface of the heater as shown in Figure 1. The attachment may be made by means of screws such as shown in Figure 2 and designated by the numerals 20—21 and 22—23. At the lower end of the cover 6 is the flaring portion 7 for discharging air into the front compartment. The adjusting lever 11 as is shown, is a simple wire suitably shaped and extending transversally through the lower portion of the cover 6. The portion of the adjusting lever which projects to the outside of the cover 6 cooperates with the segment 12 which is provided with suitable grooves for holding the lever 11 in a desired operating position. The valve is of the butterfly type and is attached to the horizontally extending portion of the adjusting lever 11 designated in the drawings Figure 2 by the reference numeral 11', the valve being shown in dotted lines designated by the numeral 24. The connection 8 for conducting heated air to the rear compartment of the automobile may be attached to the neck 13 of the cover 6 by means of a suitable union joint 17.

In Figure 4 is shown, on an enlarged scale, the manner in which the adjusting lever cooperates with the segment 12. It will be seen from this figure that the segment 12 is provided with grooves which the adjusting lever 11 may engage for holding the same in any predetermined position relative to the segment 12. The transversally extending portion of the operating lever 11 is designated by the numeral 11'. Attached to this transversally extending portion within the cover 6 is the valve member 24. Numeral 25 shows the side wall of the cover 6 in cross section.

Figure 3 shows a cross section through the cover 6 taken on line 3—3 of Figure 2. It will be seen from this Figure 3 that the transversally extending portion of the adjusting lever 11, designated by the numeral 11', is located at a point substantially in the lower plane of the flaring portion 7 of the cover 6. Attached to this portion 11' of the adjusting lever is the valve which I have shown in this Figure 3 in full line in the intermediate position and designated by the numeral 14. In this intermediate position of the valve 14, heated air from the heater 1 will be discharged through the flaring portion 7 of the cover 6 which deflects the air stream into the front compartment of the automobile, and part of the heated air will be discharged through the connection 8 leading to the rear compartment of the automobile.

Now, when it is desired to discontinue the supply of heated air to the rear compartment, all that is necessary is to operate the lever 11 so that the valve is placed in the position which is shown in dotted lines designated by the numeral 16. Further supply of heated air through the connection 8 into the rear compartment of the automobile is now prevented. The entire supply of heated air from the heater 1 will be discharged through the portion 7 of the cover 6 into the front compartment. However, when it is desired to discontinue the supply of heat into the front compartment and to supply all the heated air through the connection 8 to the rear compartment, it is merely necessary to operate the lever 11 into the other extreme position on the segment 12 (as shown in the Figures 1, 2 and 4) so that the valve assumes the position shown in dotted lines designated by numeral 15 in Figure 3. In this position of the valve, the entire supply of the heated air will be discharged through connection 8 into the rear compartment of the vehicle.

Numerals 22' and 23' in Figure 3 represent the screws for the attachment of the flange 19 of the cover 6. The connection 8 for supplying air to the rear compartment of the vehicle may be flanged at its upper end or provided with a suitable flange member which abuts against the flanged portion of the neck 13 as shown in Figure 3. A union such as 17 may be provided for maintaining the attachment between the flanged portion on the connection 8 and the flange on the neck 13.

The cooperation of the adjusting lever 11 relative to the segment 12 on the cover 6 is further illustrated in the enlarged partial side view of the cover 6 shown in Figure 5. The adjusting lever 11 shown in full lines illustrates the position of this lever when the heat supply to the rear compartment is discontinued. The intermediate position of this lever shown in dotted line corresponds to the position when heat supply is desired in the front as well as in the rear compartments, and the extreme position of the lever 11 in the substantially vertical position thereof corresponds to the position shown by numeral 15 in Figure 3, when the heat supply to the front compartment is shut off. The valve 24 is shown in dotted lines in all three positions of the adjusting lever 11. The segment 12 may be provided with grooves or with suitable indentations as shown in Figure 5.

In cases where it is desired to have a diffused heat supply in the front compartment as a natural result of the heater, and a direct supply to the rear compartment, the arrangement shown in Figures 6 and 7 may be adopted for distributing hot air to the rear compartment. This arrangement is shown in front view in Figure 6 and in side view in Figure 7.

The hot water heater is generally designated by the numeral 26 in the Figures 6 and 7. A small cover attachment 27 provided with suitable flanges 28 and 29 may be attached to the lower portion of the radiating surface of the hot water heater, by means of suitable screws such as 30 and 31. The cover 27 collects the heated air discharged through the lower portion of the radiating surface of the heater and conducts the heated air through a connection 32 to the rear compartment of the automobile or to any place or section of the vehicle which it is desired to supply with heated air. The attachment of the connection 32 may be accomplished in the same manner as shown in connection with the embodiment in Figures 2 and 3. An adjustable valve 35 is provided in the lower portion of the cover 27 where the attachment is made to the connection 32, the adjustment being secured by means of a suitable rod or wire the outer end of which is bent to form an adjusting lever 34. The valve is shown in Figures 6 and 7 in dotted line designated by the numeral 35 and the outer end of the lever which operates the valve is designated by numeral 34. The heated air escapes through the connection 32 in the direction of the arrows shown in Figures 6 and 7. The supply of heated air to the rear compartment through the connection 32 may be regulated by the valve 35 by operating the adjusting lever 34. If desired, a segment, such as 12, shown in the Figures 1, 2 and 4, may also be provided for cooperating with the adjusting lever 34 so that the adjustment may be held in any position of heat supply.

It may be desirable in certain cases to position the cover 27 in the upper portion of the radiating surface of the heater instead of in the lower portion thereof. This may be done without any difficulty by simply attaching the cover 27 in the position shown in dotted lines in Figures 6 and 7 and designated by the reference numeral 33.

In Figures 8 and 9 I have shown another embodiment of the idea illustrated also in the Figures 6 and 7. In this latter case I have provided a cover 36 attached to the left side of the radiating surface of the heater 38 for conducting part of the heat supply through the connection 41 to the rear compartment or to any section of the vehicle which it is desired to supply with heat. The connection 41 may be attached to the cover 36 in the same manner as was already discussed in connection with previous embodiments. An adjusting lever 39 is provided in the lower part of the cover 36 where the connection is made with the member 41. This adjusting lever 39, as in the previous cases, extends transversally through the corresponding portion of the cover as shown and attached to it in the interior of the cover is valve 40 for regulating the amount of heat which it is desired to discharge through the connection 41 at any time. The adjusting lever 39, as in the previous cases, may cooperate with a suitable segment for holding the lever 39 in any predetermined position of heat supply. The cover 36 may also be attached to the other side of the radiating surface of the heater 38 as is particularly indicated in dotted lines designated by the numeral 37 in Figure 8. The heated air will escape through the connection 41 to the rear compartment of the automobile in the direction of the arrows shown in Figure 8.

In Figure 10 there is particularly shown one embodiment of the valve and the adjusting lever. The valve is indicated by the reference numeral 42 and may be made of sheet iron or other suitable material provided with projections which may be rolled or wrapped about the portion 43 of the adjusting lever as shown in this figure. This portion 43 extends transversally through the cover and one end thereof designated by the numeral 44 is suitably bent to form the adjusting lever proper which projects from the cover and may be operated for adjusting the heat supply by turning the valve relative to the opening leading to the front compartment or to the connection leading to the rear compartment.

In Figures 11 and 12 I have shown an isometric view and a front view, respectively, of a further modification of the front cover designed for use when it is desired to achieve an effect such as discussed in connection with the embodiment shown in Figures 1, 2, 3, etc. The cover shown in Figures 11 and 12 is different in design from the cover shown in previous figures. It is provided on each side with a pair of ears such as indicated by the reference numerals 45—46 on one side and 45'—46' on the other side. These ears serve for the attachment of the cover to the hot water heater, covering the same entirely and thus presenting a neat and pleasing appearance. The attachment may be made by suitable screws fastening the corresponding ears to the heater. The design of the cover, that is to say, its shape is such as to collect the air blown from the hot water heater by the action of the fan and to force the air properly through the lower flaring deflecting portion 47 of the cover and through the opening 48 where the connection is made to the rear compartment of the automobile. It will be seen that the heated air will be discharged in a more diffused stream due to the shape of the flaring portion 47 which is wider at its lower end, the place of discharge. The portion 49 shown in Figure 12 may be provided with a suitable flange for abutment with a flanged hose leading to the rear compartment. If it is desired the connection may be made in any other suitable manner. The valve is shown in dotted lines in the Figures 11 and 12 and designated by the numeral 50. The valve may be attached to the corresponding transversely extending portion of the adjusting lever as is shown in Figure 10. The portion 51 of the adjusting lever which extends to the outside cooperates again with a segment such as 52 which may be serrated or provided with suitable grooves or indentations as was discussed previously. It will be understood, of course, that the cover shown in Figures 11 and 12 may be modified for attachment to the radiating surface of the heater instead of covering the entire heater. In this case, the ears 45—46 and 45'—46' will be made to project laterally from the cover. The design of the cover as shown and described is such as to guide the heated air current in stream lines in either or both directions.

The attachment of the cover may also be accomplished by means of suitable clamping or sliding provisions instead of attaching the same by means of screws. Another form of attachment resides in form of resilient projections on the cover which may be snapped over the heater and hold the cover thereon. The latter form of attachment will be particularly useful in case of small heaters and correspondingly small cover attachments. Mounting and removal of the cover is thus reduced to the simple action of snapping the cover in place over the heater.

A modification embodying the above intimated and other features is shown in Figures 13 and 14.

Referring now to Figures 13 and 14, I have shown in these figures an attachment comprising a cover 55 made of sheet metal. This cover is provided with slotted extensions such as 56 and 57, which may be flexible, there being a pair of extensions on either side of the cover. Clamping clips such as 58 and 59, each having a threaded portion, are placed behind the flange of the heater, the threaded portions project through the slotted extensions on the cover as shown, and turn nuts such as 60 and 61 are attached to the threaded portions of the clips 58 and 59 for clamping the cover in place on the heater. It is understood, of course, that when the extensions 56 and 57 are flexible or resilient they, with the clips 58 and 59, snap over the heater and hold the cover thereon.

The lower part of the device, which contains the funnel for connecting to the flexible hose and also the air directing valve, is in this embodiment a casting designated by numeral 62. The cover or hood 55 fits over the upper part of the casting as indicated by dotted lines 63 in Figure 14 and dotted lines 64—65 in Figure 13.

The air deflector 66 has a flange 67 for attachment to the hood or cover 55 as shown. Numeral 68 indicates the segment which may be serrated or provided with suitable indentations or grooves as previously discussed for cooperating with the regulating lever 69. Screw 70 is provided for holding the valve lever in assembly at the opposite end. The extension 71 on the casting 62 serves for receiving the connection which conducts heated air to the rear compartments.

It will be seen from the above description of the several drawings that I have invented a novel heating and ventilating system for automobiles which presents several features and improvements over what is known in this art. I desire to enumerate the salient points in conclusion so that they may be readily recalled when reading the appended claims.

The term—automobile—is intended to include open as well as closed types of cars. The term—compartment—is intended to include the meaning of "section" in case of an automobile having no compartments in the strict sense of the word. The term—compartment—is further intended to include that section of an automobile popularly called "extra seat" or the like. Obviously, branch hose connections may be provided to conduct heat to the bottom of extra seats in the rear of the car. For instance, small openings may be provided in the rear of the car, and lap robes so arranged or even made for this purpose in cones, so that each occupant in the open seat (or in an open car) would be encased in a stream of warm air.

I have shown and discussed certain embodiments of my invention. It will be understood of course that modifications may be devised within the scope of my invention and, therefore, I do not want to be limited to the precise embodiments which I have shown but only to the claims which follow and in which I have defined what I believe is new in the art.

What I claim as my invention is:

1. In combination with an automobile heating system having a heater disposed in the front compartment, a cover for attachment to said heater, means on said cover for deflecting heated air downwardly from said heater into the front compartment of said automobile, means removably attached to said cover for conducting heated air away from said heater to the bottom of the rear compartment of said automobile, and manually operable valve means attached to said cover for regulating the heated air delivery through said deflecting means to the front compartment and through said conducting means to the rear compartment.

2. In an automobile having a heater disposed in the front compartment thereof, a cover for removable attachment to said heater, means on said cover for delivering heated air to said front compartment, conduit means disposed in the rear compartment of said automobile, means for connecting said conduit means with said cover to supply heat thereto from said heater, and means on said cover for regulating the air supply to said front and to said rear compartments.

3. An article of manufacture comprising a hood adapted to be attached to an automobile heater, said hood including a front wall, oppositely disposed side walls, a bottom wall including downwardly converging portions terminating in a downwardly opening discharge outlet, a second outlet carried by the front wall and comprising a flared portion attached to the lower part of said front wall and providing a downwardly opening outlet adjacent said first downwardly opening outlet, and valve means carried by said hood and shiftable to a plurality of positions to divert more or less air from one outlet to another.

HERBERT E. BUCKLEN.